(12) United States Patent
Smit et al.

(10) Patent No.: US 12,454,666 B2
(45) Date of Patent: Oct. 28, 2025

(54) LOW-ALCOHOL BEER

(71) Applicant: Heineken Supply Chain B.V., Amsterdam (NL)

(72) Inventors: Hilda Els Smit, Noorden (NL); Eric Richard Brouwer, Alphen aan den Rijn (NL); Augustinus Cornelius Aldegonde Petrus Albert Bekkers, Bunnik (NL); Albert Doderer, Rijswijk (NL)

(73) Assignee: Heineken Supply Chain B.V., Amsterdam (NL)

( * ) Notice: Subject to any disclaimer, the term of this patent is extended or adjusted under 35 U.S.C. 154(b) by 0 days.

(21) Appl. No.: 18/208,509

(22) Filed: Jun. 12, 2023

(65) Prior Publication Data

US 2023/0323259 A1    Oct. 12, 2023

Related U.S. Application Data

(62) Division of application No. 17/265,604, filed as application No. PCT/NL2018/050589 on Sep. 10, 2018.

(51) Int. Cl.

| C12C 12/04 | (2006.01) |
| C12C 11/00 | (2006.01) |
| C12C 12/00 | (2006.01) |
| C12H 3/02  | (2019.01) |

(52) U.S. Cl.
CPC .............. *C12C 12/04* (2013.01); *C12C 11/00* (2013.01); *C12C 12/006* (2013.01); *C12H 3/02* (2019.02)

(58) Field of Classification Search
CPC .................................. C12H 3/02; C12C 12/04
See application file for complete search history.

(56) References Cited

U.S. PATENT DOCUMENTS

| 5,346,706 A | 9/1994 | Murray et al. |
| 5,762,991 A | 6/1998 | Dziondziak et al. |
| 6,162,360 A | 12/2000 | Ho et al. |
| 6,689,401 B1 | 2/2004 | Pfisterer et al. |
| 2005/0163884 A1 | 7/2005 | Shah et al. |
| 2012/0021110 A1 | 1/2012 | Katayama et al. |
| 2012/0207909 A1 | 8/2012 | Itakura |
| 2014/0272006 A1 | 9/2014 | Schuh et al. |

FOREIGN PATENT DOCUMENTS

| AU | 2011250112 | 11/2012 |
| AU | 2013382720 B2 | 3/2017 |
| CN | 101016503 | 8/2007 |
| CN | 108504480 | 9/2018 |
| CO | 2021003706 A2 | 4/2021 |
| CO | 2021003787 A2 | 4/2021 |
| CO | 2021004257 A2 | 4/2021 |
| EP | 0101254 | 2/1984 |
| EP | 2266421 | 12/2010 |
| EP | 2385100 A1 | 11/2011 |
| EP | 2615159 | 7/2013 |
| EP | 3088507 | 11/2016 |
| GB | 1121017 | 7/1968 |
| JP | 2013-524857 | 6/2013 |
| JP | 2017023124 | 2/2017 |
| RU | 2302456 | 7/2007 |
| WO | 9414948 | 7/1994 |
| WO | 9604363 | 2/1996 |
| WO | 9907820 | 2/1999 |
| WO | 02/04593 | 1/2002 |
| WO | 2010079643 | 7/2010 |
| WO | 2010079778 | 7/2010 |
| WO | 2011138128 | 11/2011 |
| WO | 2013107598 | 7/2013 |
| WO | 2014141544 | 9/2014 |
| WO | 2014156333 | 10/2014 |
| WO | 2014161998 | 10/2014 |
| WO | 2016199531 A1 | 12/2016 |
| WO | 2020055233 | 3/2020 |
| WO | 2020055234 | 3/2020 |
| WO | 2020055234 A1 | 3/2020 |
| WO | 2020055235 | 3/2020 |

OTHER PUBLICATIONS

Liguori et al., Elsevier, Food and Bioproducts Processing, "Production and characterization of alcohol-free beer by membrane process", 2015, vol. 94, pp. 158-168.

Andrés-Iglesias et al., Elsevier, LWT—Food Science and Technology 66, "Comparison of carbonyl profiles from Czech and Spanish lagers: Traditional and modern technology", (2016) pp. 390-397.

Andrés-Iglesias, C., "Caracterización química de compuestos sensoriales diferenciales en cervezas lager con y sin alcohol. Efectos del proceso de desalcoholización." Tesis doctoral, Universidad de Valladolid, Jul. 7, 2015.

Catarino, M., & Mendes, A., Non-alcoholic beer—A new industrial process, Separation and Purification Technology, 79(3), 2011, pp. 342-351.

(Continued)

*Primary Examiner* — Elizabeth Gwartney
(74) *Attorney, Agent, or Firm* — Banner & Witcoff, Ltd.

(57) ABSTRACT

The present invention discloses a method for preparing beer having an ethanol content of 0-1.0 vol. %, comprising providing a medium having an ethanol content of 0-20 vol. %, which medium comprises restricted-fermentation beer; subjecting said medium to a distillation step, thereby reducing the quantity of one or more aldehydes selected from the group consisting of 2-methylpropanal, 2-methylbutanal, 3-methylbutanal, 3-methylthiopropionaldehyde, phenylacetaldehyde, hexanal, trans-2-nonenal, benzaldehyde and furfural in the medium, and thereby also reducing the ethanol content, if present, to a content in the range of 0-1.0 vol. %. The invention furthermore discloses beer obtained with the said process.

14 Claims, No Drawings

(56) References Cited

OTHER PUBLICATIONS

Jackson, G. "A Technique for Identifying Foam Damage by Lipids." Journal Inst. Brew., vol. 87. pp. 242-243. Jul.-Aug. 1981.

Branyik, et al. "A Review of Methods of low alcohol and alcohol-free beer production." Journal of Food Engineering 108. pp. 493-506. Oct. 1, 2011.

Fritsch, et al. "Identification based on Quantitative Measurements and Aroma Recombination of the Character Impact Odorants in a Bavarian Pilsner-type Beer." Journal of Agricultural and Food Chemistry. 2005. vol. 53. pp. 7544-7551.

International Search Report & Written Opinion issued in corresponding PCT application No. PCT/NL2018/050589 dated May 8, 2019, 10 pages.

Mangindaan et al., "Beverage dealcoholization processes: Past, present, and future," Trends in Food Science & Technology 71, 2018, pp. 36-45, 10 pages.

Sinnott, "Fundamentals of Material Balances," Chemical Engineering Design, vol. 6, Fourth Edition, Chapter 2, 2005, pp. 49-50, 3 pages.

Campo et al., "Solid phase extraction, multidimensional gas chromatography mass spectrometry determination of four novel aroma powerful ethyl esters Assessment of their occurrence and importance in wine and other alcoholic beverages," Journal of Chromatography, 2007, 9 pages.

Perpete et al., "How to improve the enzymatic worty flavour reduction in a cold contact fermentation," Food Chemistry 70, 2000, 6 pages.

Andrés-Iglesias Ch. et al. "Simulation and flavor compound analysis of dealcoholized beer via one-step vacuum distillation", Food Research International, 2015, vol. 76, pp. 751-760 (attach is a black/white version as received from the Patent Office and a coloured version as published in press).

Jiang et al., "A novel approach for the production of a non-alcohol beer (≤0.5% abv) by a combination of limited fermentation and vacuum distillation", Institute of Brewing & Distilling, vol. 123, pp. 533-536, Oct. 12, 2017.

Piornos et al., "Alcohol-free and low-alcohol beers: Aroma chemistry and sensory characteristics", Comprehensive Reviews in Food Science and Food Safety, 2023; 22:233-259.

Van Iersel, et al., "Continuous production of non-alcohol beer by immobilized yeast at low temperature", Journal of microbiology and biotechnology, 14(6), 495-501, 1995.

Montanari et al., "Production of Alcohol-Free Beer", Beer in health and disease prevention, pp. 61-75, Elsevier Inc. 2009.

Japan Brewery Association Magazine, 1976, vol. 71, No. S , pp. 611-612.

Journal of the Brewing Society of Japan, vol. 71, No. 9, 1976, pp. 682-688.

Journal of the Brewing Society of Japan, vol. 110, No. 7, 2015, pp. 479-488.

Journal of the Brewing Society of Japan, vol. 71, No. 7, 1976, pp. 505-510.

Judgment No. 10076 of 2018 (Gyoke).

Judgment No. 10147 of 2016 (Gyoke).

LOW-ALCOHOL BEER

CROSS-REFERENCE TO RELATED APPLICATIONS

This application is a divisional of U.S. application Ser. No. 17/265,604 filed on Feb. 3, 2021, which is a US National Phase of PCT/NL2018/050589 filed on Sep. 10, 2018. These applications are herein incorporated by reference.

The present invention relates to the production of zero- or low alcohol beer having improved flavor. More particularly, the present invention provides a process of producing a non-alcoholic fermented beer in which so called 'worty' flavor notes are reduced. The invention also relates to a non-alcoholic fermented beer having a unique agreeable flavor profile with reduced undesirable worty flavor notes, which renders the beer more drinkable.

BACKGROUND

Beer is among the most popular alcoholic beverages worldwide. It is prepared by fermentation of a sugar-containing aqueous matrix derived from grains, using yeast which converts the sugars to ethanol ("alcohol"). The production process of beer is generally known, and the skilled person is capable of obtaining beer based on common general knowledge and the information disclosed herein.

Beer is commonly made from cereal such as barley, although other cereal types including but not limited to wheat or sorghum may also be used. Beer is commonly produced by a process that comprises the following basic steps: mashing a mixture of grain and water to produce a mash; separating the mash in wort and spent grain; boiling the wort to produce a boiled wort; fermenting the boiled wort with live yeast (such as *Saccharomyces pastorianus* or *Saccharomyces cerevisiae*) to produce a fermented wort; subjecting the fermented wort to one or more further process steps (e.g. maturation and filtration) to produce beer; and packaging the beer in a sealed container, e.g. a bottle, can or keg.

In an exemplary process to produce a barley malt beer, the barley is malted, which means it is germinated and subsequently dried ("kilning"), to produce malt. This process is important for the formation of taste and color compounds, and formation of enzymes which are important for further flavor development and starch degradation. Subsequently, the malt is milled and suspended in water ("mashing"). The mash is heated to facilitate starch degradation. Subsequent filtration results in wort, which is a more or less clarified aqueous solution of fermentable sugars, which also contains various flavors and aromas and many other compounds. In wort, both desirable and undesirable taste and aroma compounds are present. An overly "worty" flavor, which stems from excessive aldehyde presence, is generally considered undesirable.

The wort is boiled to sterilize it, to precipitate proteins, and to concentrate it. Optionally hop is added, to add bitterness and flavor. This mixture, after removal of the precipitate, is subjected to fermentation. Fermentation results in conversion of fermentable sugars in ethanol and carbon dioxide, and also results in formation of various new flavor compounds, among which esters. At the same time, fermentation of beer reduces the quantity of aldehydes, thereby preventing an overly worty flavor of the resulting beer. After fermentation, the beer may be filtered and/or stored, in order to optimize appearance and taste.

Health concerns and increased awareness of traffic safety associated with the alcohol content of beer have spiked interest in beer having low or even zero alcohol content. At present, there are two main techniques for the preparation of beer having low or zero alcohol content: de-alcoholisation of regular (alcohol-containing) beer, and preparation of beer a process which limits alcohol formation by means of an adapted fermentation ("restricted alcohol fermentation").

De-alcoholisation of beer is performed on regularly brewed beer, and is designed to remove ethanol, but as little as possible other flavor components. De-alcoholisation may be achieved by for instance rectification, reverse osmosis or dialysis of regular beer (see for general methodology Mangindaan et al., Trends in Food Science and Technology 71 (2018), 36-45; or Brányik et al, J. Food Eng. 108 (2012), 493-506). However, it is challenging to prevent flavor deprivation upon de-alcoholisation of beer. Consequently, a drawback of de-alcoholised beer is a flat flavor, which may be corrected by addition of flavor (taste and odor) compounds in order to obtain an acceptable beer. However, as flavor is complex due to the large variety of compounds which together are responsible for imparting flavor, de-alcoholised and subsequently flavored beer is generally considered less agreeable in taste than the taste of regular beer.

Low or zero alcohol beer can also be prepared by restricted alcohol fermentation (See Brányik et al, cited above). Restricted alcohol fermentation is a process whereby wort is fermented under conditions where there is little or no ethanol formation (or at least, where the full fermentation process results in little or no net alcohol formation).

One important process is cold contact fermentation. When wort is fermented at low temperature, yeast does barely produce alcohol, although it does produce some flavor components such as esters, even though quantities per ester may differ from the quantities obtained from regular fermentation. At low temperature, the potential of yeast to reduce aldehyde level responsible for the worty flavor is decreased. Consequently, low or zero alcohol beer produced using a cold contact process (or another restricted fermentation process) has the drawback of a relatively high aldehyde quantity, which imparts worty flavor to the low- or zero alcohol beer. In addition, such beers are generally relatively sweet, due to the presence of remaining fermentable sugars. Among the different types of restricted-fermentation beer, cold contact fermented beer is known in particular to contain high quantities of aldehydes.

In general, the flavor of beer is the result of a delicate balance between amongst others the quantity and type of various sugars, the quantity and type of various flavor compounds such as esters, and the quantity and type of various worty (aldehyde) flavors, as well as the quantity of alcohol. The presence of alcohol suppresses some taste attributes, and enhances others. For example, alcohol presence suppresses wort taste. Therefore, the taste of regular (alcohol-containing) beer cannot simply be mimicked by introducing all compounds responsible for flavor in identical quantities, in a non-alcohol beer (see Brányik et al, cited above). A small base level of aldehydes does however contribute to beer taste, as has been described in e.g. US 2012/0207909. In addition, the quantity and type of among others salts organic acids and amino compounds, such as small peptides and amino acids, affect the taste of the final beer.

Existing low- or zero alcohol beers generally suffer from a lack of drinkability. Most people become saturated with the taste after only one or two glasses, which contrasts with the drinking of regular alcohol containing beer. The saturation with taste is generally caused by an overpowering flavor, caused by overintense worty flavors due to high aldehyde levels in combination with low alcohol content, and/or too high sweetness. In addition, existing low- or zero alcohol beers often are unbalanced. The present invention provides a method to overcome these drawbacks.

SUMMARY OF THE INVENTION

The present invention discloses a method for preparing beer having an ethanol content of 0-1.0 vol. %, comprising providing a medium having an ethanol content of 0-20 vol. %, which medium comprises restricted-fermentation beer, subjecting said medium to a distillation step, thereby reducing the quantity of one or more aldehydes selected from the group consisting of 2-methylpropanal, 2-methylbutanal, 3-methylbutanal, 3-methylthiopropionaldehyde ("methional"), phenylacetaldehyde, hexanal, trans-2-nonenal, benzaldehyde and furfural, and thereby also reducing the ethanol content, if present, to a content in the range of 0-1.0 vol. %.

The present invention discloses a process in which aldehydes are reduced by distillation from a medium comprising beer obtained by restricted fermentation. This has the advantage that aldehydes are removed, which results in favorable low aldehyde quantities, and a favorable aldehyde to sugar ratio. In preferred embodiments, distillation of restricted-fermentation beer is performed in the presence of alcohol (ethanol), which imparts an even more favorable aldehyde to sugar ratio, and an improved flavor profile. If the distillation is performed on a mixture of regular beer and restricted-fermentation beer, the balance between all flavor compounds can be optimized to obtain a zero- or low-alcohol beer with improved flavor profile, which is more drinkable than existing commercial low- or zero alcohol beers. The present method allows for removal of aldehydes, which cause so-called "worty" off-flavors, while simultaneously lowering the ethanol content to obtain a zero- or low alcohol beer. In addition, the method allows to reduce the sweet taste of a zero- or low alcohol beer and thereby reduce or eliminate the overpowering flavor. This leads to a more drinkable beer.

The present invention furthermore discloses a beer having an ethanol content of 0-1.0 vol. %, having a total sugar content, defined as the total of glucose, fructose, sucrose, maltose, and maltotriose, of at least 0.2 g/100 ml; and a total content of Strecker aldehydes, defined as the total of 2-methylpropanal, 2-methylbutanal, 3-methylbutanal, 3-methylthiopropionaldehyde, and phenylacetaldehyde, of less than 50 µg/l; and/or having less than 18 µg/l, preferably less than 10 µg/l 2-methylpropanal, preferably 2-10 µg/l, less than 3.8 µg/l 2-methylbutanal, preferably 0.2-2.5 µg/l, less than 14 µg/l 3-methylbutanal, preferably 1-10 µg/l, less than 10 µg/l 3-methylthiopropionaldehyde, preferably 2-8 µg/l, less than 20 µg/l phenylacetaldehyde, preferably 1-8 µg/l, wherein the weight ratio of the total weight of 2-methylpropanal, 2-methylbutanal, 3-methylbutanal, 3-methylthiopropionaldehyde, and phenylacetaldehyde, relative to maltose, is less than 15 µg/g maltose.

It has been found that a beer as herein defined has less overpowering flavor, reduced sweet taste and lower worty flavor, and is therefore more drinkable than existing NA beer.

DETAILED DESCRIPTION

The invention discloses a method for preparing beer having an ethanol content of 0-1.0 vol. %, comprising
providing a medium having an ethanol content of 0-20 vol. %, which medium comprises restricted-fermentation beer;
subjecting the said medium to a distillation step, thereby reducing the ethanol content, if any, and thereby also reducing the quantity of one or more aldehydes selected from the group consisting of 2-methylpropanal, 2-methylbutanal, 3-methylbutanal, 3-methylthiopropionaldehyde, phenylacetaldehyde, hexanal, trans-2-nonenal, benzaldehyde and furfural.

In the present context, beer is to be understood in a broad sense, that it, beer may refer to any type of beer, including but not limited to ale, porter, stout, lager and bock beer. Beer is preferably a malt-based beer, that is, a beer prepared from the fermentation of wort prepared from (among others) malt. Preferably, beer is lager beer, which is a beer obtained by fermentation at 7-15° C. using a bottom-fermenting yeast, and subsequent lagering at low temperature. Lager beer includes for example pilsner. Most preferably, a beer as described herein is a pilsner. A pilsner is a pale lager beer. It is a purpose of the invention to provide an NA beer which has the taste and drinkability of a regular beer.

In the present text, "zero or low alcohol beer" is a beer having an ethanol content of 1.0 vol. % ("ABV") or less, preferably 0.5 vol. % or less, more preferably 0.2 vol. % or less. Such beers will be called NA beer. Thus, NA beer is a beer having an ethanol content of 0-1.0 vol. %, such as preferably 0-0.5 vol. %.

In the present context, "aldehydes" or "total aldehydes" refers to the aldehydes 2-methylpropanal, 2-methylbutanal, 3-methylbutanal, 3-methylthiopropionaldehyde, phenylacetaldehyde, hexanal, trans-2-nonenal, benzaldehyde and furfural. Among the aldehydes are "Strecker aldehydes", which are the aldehydes 2-methylpropanal, 2-methylbutanal, 3-methylbutanal, 3-methylthiopropionaldehyde, and phenylacetaldehyde.

The invention discloses a method for the distillation of a medium comprising restricted-fermentation beer, which method reduces the quantity of aldehydes, among which Strecker aldehydes.

A restricted-fermentation beer is defined as a fermented beer which has been obtained by restricted ethanol fermentation of wort. Restricted ethanol fermentation of wort is fermentation which does not result in significant net ethanol formation. That is, restricted fermentation as defined herein results in 1 vol. % or less, preferably 0.5 vol. % or less ethanol. A restricted-fermentation beer thus has an ethanol content of 1.0 vol. % or less, preferably 0.5 vol. % or less. The skilled person is aware of various restricted fermentation techniques which do not result in significant net ethanol formation. Examples are restricted ethanol fermentation of wort characterized by a temperature below 7° C., preferably −1-4° C., such as −0.5-2.5° C., preferably for a period of 8-72 hours, more preferably 12-48 hrs ("cold contact fermented beer"); and/or a short (e.g. less than 2 hours) fermentation time, which fermentation stopped quickly by temperature inactivation, such as by rapid cooling to −0.5-1° C., optionally followed by subsequent pasteurization ("arrested fermentation beer"); and/or fermentation by a yeast strain which produces relatively low quantities of ethanol under the applied fermentation conditions, such as for example a yeast strain which produces less 0.2 g ethanol per gram fermentable sugar in the wort, preferably less than 0.1 g ethanol per gram fermentable sugar. Suitable strains (e.g. Crabtree negative strains) are known in the art, and the quantity of ethanol produced under varying fermentation conditions can be determined by routine experiments ("yeast-restricted beer"); and/or fermentation using a first, ethanol-producing yeast strain, in the presence of a sufficient quantity of a second yeast strain which consumes ethanol, such as *Saccharomyces rouxii*, to consume substantially all ethanol produced by the first yeast strain; and/or wort having a content of fermentable sugars such that max 1.0 vol. % of alcohol is produced after completion of its fermentation. In this case, the wort generally has a content of fermentable sugars of less than 17.5 g/l, preferably less than 12 g/l, more preferably less than 8 g/l ("sugar-deprived wort beer").

A restricted-fermentation beer is a beer obtained by restricted ethanol fermentation of wort. Restricted fermentation is process in which the product obtained from the fermentation has an ethanol content of 1.0 vol. % or less, preferably 0.5 vol. % or less. Such beers can be obtained by generally known methods, such as for example described in Brányik et al, J. Food Eng. 108 (2012), 493-506. Usually, the total quantity of Strecker aldehydes in restricted fermentation beer is at least 60 µg/l, and total aldehyde quantity is at least 600 µg/l.

Restricted-fermentation beer has not been subjected to a de-alcoholisation step to attain the said ethanol content of 1.0 vol. % or less, preferably 0.5 vol. % or less. The skilled person knows various suitable techniques for de-alcoholisation of a fermented beer, and none of these techniques has been applied to attain the said ethanol content of 1.0 vol. % or less, preferably 0.5 vol. % or less. A restricted-fermentation beer, in the present context, may optionally be subjected to a de-alcoholisation step to reduce the ethanol content from 1.0 vol. % or less, preferably 0.5 vol. % or less obtained from the fermentation, to a lower ethanol content. Preferably however, a restricted-fermentation beer as defined herein has not been subjected to a de-alcoholisation step at all.

A de-alcoholisation step as used for de-alcoholisation of beer is well-known in the art, and may refer to for example a rectification step, a reverse osmosis step, a dialysis step or a freeze concentration step to remove ethanol from the fermented beer. Such techniques are for instance described in Mangindaan et al, cited above.

The restricted-fermentation beer is preferably a sugar-deprived wort beer, a yeast-restricted beer, an arrested fermentation beer, or a cold contact fermented beer. In one embodiment, the restricted-fermentation beer is a sugar-deprived wort beer. In a further embodiment, the restricted-fermentation beer is a yeast-restricted beer. In yet a further embodiment, the restricted-fermentation beer is an arrested fermentation beer. In yet a further embodiment, the restricted-fermentation beer is a cold contact fermented beer. In preferred embodiments, the restricted-fermentation beer is a cold contact fermented beer.

Cold contact fermentation is well-known in the art, and the skilled person may obtain a cold contact fermented beer by any means known in the art or disclosed herein. An exemplary method to obtain a cold contact fermented beer is for example described in Brányik et al, cited above. Alternatively, cold-contact fermented beer can be obtained commercially.

The distillation of a medium comprising restricted-fermentation beer results in the removal (from the medium) of one or more aldehydes selected from the group consisting of 2-methylpropanal, 2-methylbutanal, 3-methylbutanal, 3-methylthiopropionaldehyde, and phenylacetaldehyde. These aldehydes will be referred to collectively as "Strecker aldehydes". The distillation also effects removal of one or more aldehydes selected from the group consisting of 2-methylpropanal, 2-methylbutanal, 3-methylbutanal, 3-methylthiopropionaldehyde, phenylacetaldehyde, hexanal, trans-2-nonenal, benzaldehyde and furfural. These aldehydes will be referred to collectively as "total aldehydes".

Distillation is a known process, and the skilled person is capable of determining suitable conditions for distillation based on common general knowledge and the information disclosed herein. In preferred embodiments, the distillation is performed at a temperature of 10-100° C., more preferably 20-65° C., more preferably 30-50° C., even more preferably 40-46° C. The distillation is further preferably performed at reduced pressure, such as at a pressure of 0.01-500 mbar, preferably 1-200 mbar, more preferably 50-150 mbar, and even more preferably 80-110 mbar.

Preferably, the distillation is a vacuum distillation, at a temperature and pressure as described. A vacuum distillation process in accordance with the present invention may comprise one or more of the steps of pre-heating of the medium, for example in a heat exchanger optional degassing of the medium, for example in a vacuum degasser separation of the medium from aldehydes and ethanol, if present, in one or more vacuum columns, for example a packed-bed column cooling and optional carbonation of the resulting zero- or low alcohol beer.

The skilled person is capable of selecting suitable equipment to perform the distillation. The distillation may for example be performed in a commercial rectification column. The skilled person is capable of selecting a suitable setup on the basis of common general knowledge, such as described in "Chemical Engineering Design", by R. K. Sinnott (Volume 6, fourth edition, 2005).

As will be understood by the skilled person, the distillation can be adapted to obtain a desired ethanol content. In preferred embodiments, the ethanol content of the beer obtained after distillation is 1 vol. % or less, preferably 0.5 vol. % or less, even more preferably 0.2 vol. % or less, even more preferably 0.1 vol. % or less. A beer having 1 vol. % or less ethanol can also be called a zero- or low alcohol beer or NA beer.

The medium to be distilled is a medium comprising restricted-fermentation beer. In one embodiment, the medium comprises only restricted-fermentation beer, in which embodiment the invention discloses a method for the distillation of restricted-fermentation beer, which method effects the removal of aldehydes (and ethanol, if present), from the restricted-fermentation beer. Preferred types of restricted fermentation beer have been defined above.

In another embodiment, the medium to be distilled is a medium comprising restricted-fermentation beer and an additional quantity of ethanol. In this embodiment, the medium preferably comprises restricted-fermentation beer and has a total ethanol content of 1-15 vol. %, preferably 2-10 vol. %, more preferably 2.5-7.5 vol. %. In this embodiment, the medium has been obtained by a step in which ethanol is added to the restricted fermentation beer. In this embodiment, the distillation step further effects the removal of ethanol from the medium.

Ethanol may be combined with the restricted fermentation beer as pure (such as for example more than 95%, preferably more than 98%) ethanol, or as an aqueous medium comprising ethanol, such as an aqueous medium comprising at least 2 vol. %, preferably at least 4 vol. % ethanol. In much preferred embodiments, the aqueous medium comprises 2-15 vol. % ethanol, preferably 4-10 vol. % ethanol.

It is an additional advantage of this embodiment that aldehyde removal in the presence of alcohol becomes less efficient. This is favorable, because a certain base level of aldehydes is preferred to impart full beer taste, as has been described in for instance US 2012/0207909. Said base level of aldehydes, in combination with suitable flavor compounds, leads to a beer having low sweetness and low worty flavor, which is appropriately balanced. It has been found preferable in low- or zero alcohol beer as herein defined if Strecker aldehydes are present in a quantity of at least 10 μg/l; total aldehydes are preferably present in a quantity of at least 25 μg/l. By performing the distillation step in the presence of alcohol as disclosed above, the aldehyde to sugar ratio can be optimized, thereby resulting in a zero- or low alcohol beer with improved flavor.

In much preferred embodiments, the aqueous medium comprising ethanol is a regular beer. In this embodiment, the medium comprises a mixture of restricted-fermentation beer and regular beer. Preferably, the medium is a mixture of restricted-fermentation beer and regular beer.

"Regular beer", in this context, is regularly brewed beer, obtained using a fermentation process which results in more than 1 vol. % ethanol. Thus, regular beer, as herein defined, has an ethanol content of more than 1 vol. %, and preferably less than 15 vol. %. The ethanol content of the regular beer is preferably 2-15 vol. %, more preferably 2.5-12 vol. %, more preferably 3.5-9 vol. %. The regular beer is preferably a lager beer, as described above, most preferably a pilsner. The skilled person is capable of obtaining regular beer, among which regular lager beer and pilsner, for instance by the methods described in The Brewers Handbook (second edition) of Ted Goldammer (2008, Apex publishers). Alternatively, regular beer can be obtained commercially. Regular beer generally comprises a total quantity of Strecker aldehydes of 50 μg/l or less, and a total quantity of aldehydes of 400 μg/l or less.

Embodiments in which the medium comprises regular beer and restricted fermentation beer are much preferred, because these embodiments effect further advantages.

First, creating a mixture of restricted-fermentation beer and regular beer means that the restricted-fermentation beer is diluted. This in turn means that the aldehyde quantity to be removed from the medium by distillation is reduced by dilution, as aldehydes are present in higher quantities in restricted-fermentation beer, than in regular beer. This reduces processing time and energy. However, the dilution step alone does not reduce the aldehydes to the quantities required, so that the distillation step is still required to effect sufficient aldehyde removal.

Second, regular beer comprises higher quantities of flavor compounds such as esters than restricted-fermentation beer. By mixing restricted-fermentation beer and regular beer, the quantity and type of flavor compounds in the medium is increased, which leads to increased quantities and types of flavors in the final beer after distillation.

In particular, a preferred regular beer used in a method according to the invention comprises ethyl-2-methylpentanoate, which is important to mask worty (aldehyde) taste, to impart a refreshing flavor, and to render the beer more drinkable. (See co-pending application with title "Low alcohol beer with reduced wort flavor" (PCT/NL2018/050587) filed on the same day).

Also, regular beer comprises free amino nitrogen, among which amino acids, which also contributes to taste of the final beer. By mixing restricted-fermentation beer and regular beer, the medium becomes enriched with among others free amino nitrogen. The beer obtained from distillation thus preferably comprises 20-250 mg/l of free amino nitrogen (FAN), more preferably 50-200 mg/l, more preferably 75-150 mg/l.

In addition, regular beer comprises ethyl-2-methylpentanoate, which in turn becomes part of the final beer. Thus, the final beer usually comprises at least 0.001 μg/l ethyl-2-methylpentanoate, which imparts a refreshing flavor, and has been found particularly effective in masking aldehyde taste. Preferably the ethyl-2-methylpentanoate quantity is in the range of 0.001-1000 μg/l.

Third, regular beer comprises foam negative factors. An important foam-negative factor is AcHFA. The effects of AcHFA as a foam-negative factor have been described in co-pending application with title "foam stability" (PCT/NL2018/050588), filed on the same day.

AcHFA ("acetylated hydroxy fatty acid") is a C12-C22 fatty acid, comprising a carboxylic acid group and a C11-C21 linear alkyl group, which alkyl group may be partially unsaturated, and which alkyl group is substituted with at least one hydroxy group and at least one acetate group. An acetate group ($H_3CCO_2\sim$) is abbreviated (as common in the art) as $\sim$OAc.

AcHFA may be defined as structure 1

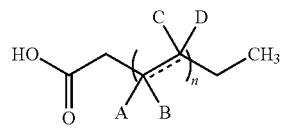

wherein n= is an integer ranging from 4-9, and wherein each ⚏, A, B, C and/or D can be the same or different, and wherein either a) ⚏ is a single bond, in which case:
one of A and B is H, OH or OAc, and the other of A and B is H;
one of C and D is H, OH or OAc, and the other of C and D is H; or b) ⚏ is a double bond, in which case:
one of A and B is H while the other of A and B is not present (which means that the other of A and B is nothing), and one of C and D is H while the other of C and D is not present (which means that the other of A and B is nothing);
provided that in structure 1, at least one of all A, B, C, D is OH and at least one of all A, B, C, D is OAc.

As is commonly known, the double bond may have cis or trans configuration, but preferably, the configuration is cis. Furthermore, as is common for organic acids, the acid group may be in neutral form (as depicted; $\sim CO_2H$), but may also be in ionic form ($\sim CO_2^-$), or in salt-form (($\sim CO_2)_xM$, wherein M can be any metal ion, and preferably a metal ion available in beer, such as for example an ion of Na, K, Ca, Mg, Fe, Cu, Zn or Mn, and wherein x=1 if M is monovalent (Na or K), and wherein x can be 1, 2 or 3 for higher valency ions. Carbon atoms bearing OH or OAc may independently have R or S configuration, but preferably, adjacent carbon atoms bearing an OH and an OAc group both have R-configuration, or both have S configuration (RR and SS). Alternatively, one carbon atom of adjacent carbon atoms bearing an OH and an OAc group has an S configuration, and the other carbon of the two adjacent carbon atoms has an R configuration (RS or SR).

Preferably, AcHFA comprises one hydroxy group and one acetate group which are located on adjacent carbon atoms, among the optionally multiple hydroxy and/or acetate groups. Further preferably, AcHFA is a C16·C20 fatty acid (n=6-8 in structure 1), most preferably a C18 fatty acid (n=7 in structure 1). It is much preferred if AcHFA comprises 1 or 2 double bonds, preferably one double bond. Double bonds are preferably located on the $6^{th}$, $9^{th}$, $12^{th}$ or $15^{th}$ carbon atom, counting (as usual) from the carboxylic acid group. Most preferably, a double bond is located on the 9th carbon atom.

In much preferred embodiments, AcHFA is represented by structure 2:

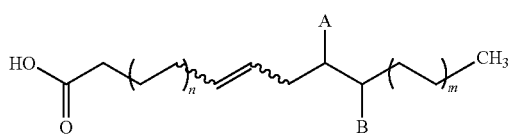

2 wherein
n=1, 2, or 3, preferably 2 or 3, most preferably 3;
m=1 or 2, preferably 2;
one of A and B is OH, and the other of A and B is OAc.

Also for structure 2, the double bond may have cis or trans configuration (depicted by the line format ⁓⁓⁓, which indicates that the orientation of a carbon-carbon single bond which extends from a carbon-carbon double bond can be in any direction), but preferably, the configuration is cis. The acid group in structure 2 may be in neutral form, as depicted, but may also be in ionic form or salt form, as defined above.

In much preferred embodiments, AcHFA is represented by structure 3:

3 wherein one of A and B is OH, and the other of A and B is OAc. In these embodiments, AcHFA is (cis or trans; RR, SS, RS or SR) 12-acetoxy-13-hydroxyoctadec-9-enoic acid (3a), or (cis or trans; RR, SS, RS or SR) 13-acetoxy-12-hydroxyoctadec-9-enoic acid (3b):

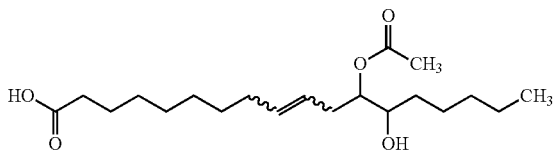

3a

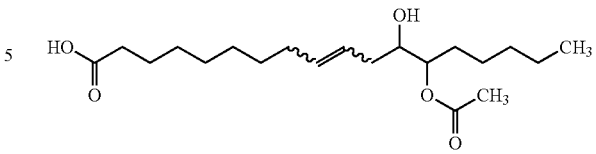

3b

By mixing restricted-fermentation beer and regular beer, the quantity of AcHFA in regular beer is reduced by dilution. Thus, the quantity of foam-negative factors in the beer obtained with the present method can be kept to acceptably low levels. This has a positive effect on foaming, in particular foam stability. In addition, the quantity of AcHFA can be reduced, such as by adsorption to a zeolite, a hydrophobic adsorbent, or a hydrophilic adsorbent, as is described in the co-pending application cited above. This results in a beer with less than 2 mg/l AcHFA, preferably less than 1.5 mg/l AcHFA, preferably less than 1.0 mg/l, more preferably less than 0.5 mg/l, even more preferably less than 0.25 mg/l. Beer with lower quantities of AcHFA have improved foam stability.

When the present method is performed on a medium comprising a mixture of restricted-fermentation beer and regular beer, the medium preferably is a mixture of (only) restricted-fermentation beer and regular beer. The volumetric ratio between the restricted-fermentation beer and the regular beer is preferably 1:99-99:1, preferably 5:95-50:50. It has been found that distillation of a mixture at this ratio optimizes the presence of the various flavor compounds, worty flavors, sugars and foam factors, as described herein.

The above method leads to a low- or zero alcohol beer with improved taste. The obtained beer has an ethanol content of 0-1.0 vol. %. The ethanol content of the beer obtained by the present method may be less than 0.5 vol. %, preferably less 0.2 vol. %, more preferably less than 0.1 vol %.

In preferred embodiments, the total of 2-methylpropanal, 2-methylbutanal, 3-methylbutanal, 3-methylthiopropionaldehyde, and phenylacetaldehyde ("Strecker aldehydes") is the obtained beer is less than 50 µg/l. The total of 2-methylpropanal, 2-methylbutanal, 3-methylbutanal, 3-methylthiopropionaldehyde, phenylacetaldehyde, hexanal, trans-2-nonenal, benzaldehyde and furfural ("total aldehydes") is preferably less than 80 µg/l.

In much preferred embodiments, the obtained beer comprises
  a quantity of 2-methylpropanal of less than 18 µg/l, preferably less than 10 µg/l, more preferably 2-10 µg/l, and/or
  a quantity of 2-methylbutanal of less than 3.8 µg/l, preferably 0.2-2.5 µg/l, and/or
  a quantity of 3-methylbutanal of less than 14 µg/l, preferably 1-10 µg/l, and/or
  a quantity of 3-methylthiopropionaldehyde of less than 10 µg/l, preferably 2-8 µg/l, and/or
  a quantity of phenylacetaldehyde of less than 20 µg/l, preferably 1-8 µg/l.

In preferred embodiments, all Strecker aldehydes are present in these preferred quantities.

The total sugar content of the obtained NA beer, defined as the total of glucose, fructose, sucrose, maltose, and maltotriose, is preferably at least 0.2 g/100 ml. It is preferred if the total sugar content is relatively low, such as at most 3 g/100 ml, preferably at most 2 g/100 ml. In preferred embodiments, the total sugar content is 0.5-2.0 g/100 ml, preferably 1.2-2.0 g/100 ml.

The obtained beer preferably comprises at least 0.2 g/100 ml maltotriose. The beer further preferably comprises at least 0.05 g/100 ml glucose and/or at least 0.05 g/100 ml fructose. It is further preferred if the total sugar content of the obtained beer comprises 50-100 wt. % of maltose, preferably 50-80 wt. %, more preferably 50-65 wt. %. The maltose content of the final beer is preferably at least 0.5 g/100 ml.

The presently disclosed method results in a low- or zero alcohol beer which has an optimized aldehyde to sugar ratio. Preferably, the total weight of Strecker aldehydes relative to maltose is less than 15 µg/g maltose, and the total aldehyde weight, relative to maltose, is less than 90 µg/g maltose, preferably less than 50 µg/g maltose. A preferred lower limit of the total weight of Strecker aldehydes relative to maltose is 0.01 µg/g maltose, preferably 0.1 µg/g maltose. A preferred lower limit of total aldehydes, relative to maltose, is 0.1 µg/g maltose, preferably 0.5 µg/g maltose. In particular, the weight of 2-methylpropanal, relative to maltose, is between 0.1 and 11, preferably between 0.2 and 5, more preferably between 0.25 and 2 µg/g maltose; and/or the weight of 2-methylbutanal, relative to maltose, is between 0.05 and 6, preferably between 0.1 and 2.5, more preferably between 0.1 and 0.5 µg/g maltose; and/or the weight of 3-methylbutanal, relative to maltose, is between 0.05 and 25, preferably between 0.1 and 16, more preferably between 0.12 and 2 µg/g maltose; and/or the weight of 3-methylthiopropionaldehyde, relative to maltose, is between 0.1 and 5, preferably between 0.2 and 4, more preferably between 0.25 and 0.8 µg/g maltose; and/or the weight of phenylacetaldehyde, relative to maltose, is between 0.1 and 10, preferably between 0.2 and 5, more preferably between 0.45 and 2.8 µg/g maltose.

In a much preferred embodiment, the weight of 2-methylpropanal, relative to maltose, is between 0.1 and 11, preferably between 0.2 and 5, more preferably between 0.3 and 2 µg/g maltose.

In another much preferred embodiment, the weight of 2-methylbutanal, relative to maltose, is between 0.05 and 6, preferably between 0.1 and 2.5, more preferably between 0.1 and 0.5 µg/g maltose.

In another much preferred embodiment, the weight of 3-methylbutanal, relative to maltose, is between 0.05 and 25, preferably between 0.1 and 16, more preferably between 0.12 and 2 µg/g maltose.

In another much preferred embodiment, the weight of 3-methylthiopropionaldehyde, relative to maltose, is between 0.1 and 5, preferably between 0.2 and 4, more preferably between 0.25 and 0.8 µg/g maltose.

In another much preferred embodiment, the weight of phenylacetaldehyde, relative to maltose, is between 0.1 and 10, preferably between 0.2 and 5, more preferably between 0.45 and 2.8 µg/g maltose.

The beer obtained from the distillation preferably comprises ethyl-2-methylpentanoate, such as in a quantity of at least 0.001 µg/l, preferably 0.001-1000 µg/l, which ensures the obtained beer has improved taste, relative to other zero- or no alcohol beers, due to the wort-taste masking effect of ethyl-2-methylpentanoate, and the refreshing flavor which it imparts to the final beer. The quantity of EMP in the NA beer is at least 0.001 µg/l, preferably at least 0.004 µg/l, more preferably at least 0.01 µg/l, even more preferably at least 0.1 µg/l. Preferred quantities of EMP include 0.1-1000 µg/l, preferably 1-800 µg/l, more preferably 10-500 µg/l. In preferred embodiments, the quantity of EMP 50-600 µg/l.

The beer obtained from the distillation preferably comprises 1-20 µg/l, preferably 1.5-5 µg/l ethyl propanoate, which is important for imparting taste. It is an advantage of the present method that the esters ethyl-2-methylpentanoate and ethyl propanoate remain in the beer at least partly upon distillation.

The beer obtained from the distillation further preferably comprises 0.05-30 mg/l ethyl acetate, preferably 0.1-15 mg/l ethyl acetate, more preferably 0.1-1 mg/l. This, also, is important for imparting taste.

The beer obtained from the distillation further preferably comprises iso-amyl acetate in a quantity of 0.05-7.5 mg/l, preferably 0.08-4.5 mg/l. Iso-amyl acetate is an important contributor to beer flavor.

A preferred beer obtained with the present method further comprises 20-250 mg/l of free amino nitrogen (FAN), more preferably 50-200 mg/l, more preferably 75-150 mg/l. Free amino nitrogen, as used herein, refers to the total quantity of free amino compounds as determined by the NOPA method. This method results in quantification of primary amino compounds, such as free amino acids, small peptides and ammonia. The recited quantity of FAN is an important aspect of the final beer taste and color.

A preferred beer obtained with the present method further comprises less than 5 mg/l acetaldehyde, preferably less than 3 mg/l. This is important for the flavor profile of the obtained beer.

In optional embodiments, the beer can be further flavored with a flavoring, as is known in the art. Suitable components of a flavoring can for instance be various esters, acids and higher alcohols.

Advantages of the present beer include reduced taste intensity, in that the beer has a less overpowering taste, in particular reduced sweetness and reduced worty flavor. The present beer has low sweetness, and favorable aldehyde levels even relative to this lowered sweetness. This has the result that at lower sweetness and taste intensity, the beer is not considered worty, and consumers do not become saturated with the taste after only a few beers. In addition, the beer is generally considered less thick, and more refreshing. Thus, a beer of the present invention is more drinkable than existing zero-alcohol or low-alcohol beers.

For the purpose of clarity and a concise description features are described herein as part of the same or separate embodiments, however, it will be appreciated that the scope of the invention may include embodiments having combinations of all or some of the features described.

The invention will now be further illustrated by the following, non-limiting examples.

Methods

Determination of aldehydes in beer using on-fibre derivatization solid phase micro extraction and gas chromatography—mass spectrometry.

Sample Preparation

Under a $CO_2$ atmosphere, 30.0 g of beer sample was weighed in a 40 ml vial. With a 50 µl gas-tight syringe, 30 µl of internal standard solution was added to each sample.

Next, still under a CO$_2$ atmosphere, two 10 ml headspace vials were filled with 4.0 g of sample. Thus, the beer sample was analyzed in duplicate.

Derivatization Procedure

A stock solution of ca 200 mg/l O-(2,3,4,5,6-pentafluorobenzyl)-hydroxylamine (PFBHA) in deionized water was prepared. A standard 20 ml clear glass crimp-cap headspace vial was filled with 14 g of the PFBHA solution. Next, an SPME fibre (Supelco) was placed in the headspace of the derivatization vial for 10 minutes at 30° C. to soak the PDMS/DVB phase of the SPME fibre with the derivatization agent. The SPME fibre soaked with PFBHA was then placed in the headspace of a beer sample (4.0 g in 10 ml vial, filled under a CO$_2$ atmosphere), leading to PFBHA-derivatives of the aldehydes of interest. The extraction conditions were chosen at 30 minutes at 30° C.

GC Conditions

An Agilent 7890A gas chromatograph, equipped with a split/splitless inlet, was used for this method. Optimal separation of the PFBHA/aldehyde compounds was achieved with a 30 m×0.25 mm×0.25 μm VF17MS column (Agilent). Some compounds co-elute, but in these cases the selectivity of the MS was able to circumvent the need of chromatographic separation. Certain aldehydes may co-elute, but the mass spectrometer targets selective ions for each compound.

Helium at 1 ml/min is used as carrier gas. A split ratio of 5 used to optimize peak width and sensitivity. The oven was programmed as 50° C. (2 minutes) with a 10° C./min rise to 230° C., followed by a 30° C./min rise to 290° C. (hold 2 minutes).

MS Conditions

The Agilent 5975C MSD was set-up for negative chemical ionization (NCI).

For all aldehydes targeted in this methodology, a suitable ion fragment was chosen. In most cases, a compound specific fragment was chosen rather than the most abundant fragment. This allows the selective determination of the target compounds of interest. In most cases, the molecular ion Mw minus m/z 20 (loss of H—F) is best suited.

As most PFBHA-aldehyde compound consists of two peaks (syn- and anti-), the peak areas are summed. Quantification of all aldehyde compounds was possible by setting up appropriate calibration curves based on standard addition to Heineken beer.

Determination of Ester Compounds in Beer Using Stir Bar Sorptive Extraction and Gas Chromatography—Mass Spectrometry Due to the large concentration range of the analytes, the samples have to be analyzed twice with different GC-MS methods; one for the determination of high concentration compounds, and one for the low concentration compounds. The difference between the two methods is the operation mode of the mass selective detector. The quantity of extract which is injected is adapted to the operation mode of the detector, as is known in the art. Iso-amyl acetate was determined using the high concentration method, and ethyl acetate was determined using the low concentration method.

Sample Preparation

In duplicates, 30.0 g of beer sample was weighed in a 40 ml vial. With a 50 μl gas-tight syringe, 30 μl of internal standard solution was added to each sample. Next, a clean and pre-conditioned twister was added to each sample. A 60 position stir plate was used to extract the samples. Extraction time is one hour. In order prevent the formation of light-induced compounds, the samples are covered.

Instrument Conditions

The Agilent 7890B gas chromatograph was coupled to an Agilent 5977A MSD. Sample introduction is performed by a Gerstel MPS2-XT robot, in combination with a TDU-2 thermal desorption unit and CIS-4 controlled temperature inlet (both from Gerstel). The main capillary column was a 50 m×0.25 mm×0.25 μm DB-5MS UI. Helium at 1.5 ml/min was used for carrier gas. The thermal desorption of the twisters was performed in solvent vent mode, trapping the eluents at −20° C. on a tenax-filled liner. During the heating step, the injector switched to a split ratio 100:1 and 6:1 for the high and low concentration method respectively. The oven was programmed as 40° C. (2 minutes) with a 10° C./min rise to 280° C. (hold 1 minutes). The MSD was set for scan mode (33-300 m/z) in the high concentration method, and in single ion mode for the low concentration method.

Quantification of all compounds was made possible by the preparation of calibration curves (standard addition to a suitable matrix beer (e.g. Heineken beer). All calibrations are performed in both alcohol containing and 0.0% alcohol containing beverages.

Determination of Sugar Content in Wort, Beer and Cider

The sugar content was measured with Ultra Performance Liquid Chromatography (UPLC). UPLC can be suitably conducted at a temperature of 65° C. A suitable choice for the eluent is a mixture of acetonitrile/water, for example in a 75/25 volume ratio. The detector used is typically a Refractive Index (RI) detector. The sugar content of a sample was determined by comparing the UPLC curve of the sample with calibration curves of standard samples with known sugar concentrations.

The samples for UPLC were prepared as follows. A sample of beer or wort was diluted by a factor 5 by addition of acetonitrile/water mixture (50/50—equal volume parts). If present, CO2 was removed prior to dilution (e.g. by shaking or stirring the sample). After dilution, the sample was filtrated to obtain a clear solution. The filtered sample was injected into the UPLC at 65° C. using the above-mentioned eluent.

Determination of Free Amino Nitrogen (FAN)

The amount of free amino nitrogen (such as amino acids, small peptides and ammonia) was measured according to the Nitrogen by 0-Phthaldialdehyde Assay (NOPA) method. The NOPA method was conducted using a photometric analyzer (e.g. Gallery™ Plus Photometric Analyzer). According to the NOPA method, a test sample is subjected to a treatment with ortho-phtaldialdehyde (OPA) and N-acetylcystein (NAC). This treatment will results in the derivatization of primary amino groups present in the test sample under the formation of isoindoles. The content of the isoindoles is subsequently determined using the photometric analyzer at a wavelength of 340 nm. The free amino nitrogen (expressed in mg FAN/l) can then be calculated based on the measured content of the isoindoles. If necessary, the beer or wort sample is first subjected to centrifugation to clarify the sample and/or to a CO2 removal step (e.g. by stirring or shaking the sample) before analysis.

Determination of Ethanol in Beer

The ethanol content was measured using a photometric analyzer (e.g. Gallery™ Plus Photometric Analyzer). The test sample is subjected to an enzymatic method wherein the ethanol present in the sample is converted to acetaldehyde with alcohol dehydrogenase (ADH). The acetaldehyde content is subsequently determined using the photometric analyzer at a wavelength of 340 nm. The ethanol content can be calculated based on the acetaldehyde content. If necessary, the beer or wort sample is first subjected to centrifugation to clarify the sample and/or to a CO2 removal step (e.g. by stirring or shaking) before analysis.

Example 1

Distillation of Various Media Comprising Restricted-Fermentation Beer

A cold-contact fermented beer and a regular lager beer were obtained by generally known methods. The regular beer was a lager beer, which can be commercially obtained. Wort, as a comparative example, was obtained as is known in the art.

A continuous vacuum distillation setup was provided, capable of processing beer at a rate of 4 hl/hour. The setup comprised a pre-heater, a degassing system, two vacuum distillation columns including a condenser, an evaporator, and a cooling system with plate heat exchanger. Also, the setup comprised a carbonation system. The installation was set to provide 90 mbar absolute pressure, resulting in a temperature of 43° C. in the vacuum distillation columns.

Media comprising, as a restricted-fermentation beer, the cold-contact fermented beer were subjected to distillation. The distilled media were wort (comparative), cold-contact fermented beer (CC), and mixtures of cold-contact fermented beer and regular beer (LB) in various volumetric ratios. The quantities of various aldehydes, esters and sugars were determined before and after distillation. The results are displayed in Table 1.

The results show that the quantity of aldehydes is reduced by the distillation. Distillation of CC, 50/50 LB/CC, 80/20 LB/CC and 90/10 LB/CC results in reduction of Strecker aldehydes to 20, 40, 67 and 76% of the quantity prior to distillation, respectively. The same examples show reduction of total aldehydes to 7, 11, 19 and 22% of the quantity prior to distillation, respectively. From the results it is apparent that aldehydes can be effectively removed from a medium comprising restricted-fermentation beer by distillation, and that this removal functions, slightly less efficient, in mixtures comprising ethanol. The slightly lower efficiency is beneficial, because small threshold quantities of aldehydes are important for imparting beer taste. The results furthermore show that it is favorable to perform the distillation on a mixture of regular beer and restricted-fermentation beer, for instance in order to attain FAN levels not attainable otherwise, or to include esters from a natural fermentation source, among which ethyl-2-methylpentanoate and ethyl propanoate.

TABLE 1

| | Wort | | CC | | 50/50 LB/CC | | 80/20 LB/CC | | 90/10 LB/CC | |
|---|---|---|---|---|---|---|---|---|---|---|
| Distillation: | before | After | before | after | before | after | before | after | before | after |
| 2-methylpropanal (µg/l) | 27.68 | 1.01 (3.7%) | 18.90 | 1.05 (5.6%) | 13.01 | 1.90 (14.6%) | 9.07 | 3.19 (35.1%) | 7.48 | 3.64 (48.7%) |
| 2-methylbutanal (µg/l) | 31.04 | 0.91 (2.9%) | 5.87 | 0.89 (15.2%) | 3.78 | 1.03 (27.3%) | 3.20 | 1.33 (41.5%) | 2.81 | 1.38 (49.2%) |
| 3-methylbutanal (µg/l) | 62.59 | 1.84 (2.9%) | 10.07 | 1.19 (11.8%) | 4.79 | 1.28 (26.8%) | 4.38 | 1.49 (33.9%) | 3.90 | 1.45 (37.2%) |
| MTP# (µg/l) | 47.40 | 22.01 (46.4%) | 12.31 | 5.27 (42.8%) | 6.73 | 4.95 (73.5%) | 4.58 | 5.14 (112.3%) | 3.05 | 3.83 (125.5%) |
| phenylacetaldehyde (µg/l) | 68.74 | 11.51 (16.7%) | 10.09 | 3.17 (31.4%) | 5.54 | 4.30 (77.7%) | 5.85 | 6.86 (117.3%) | 5.48 | 7.03 (128.3%) |
| Hexanal (µg/l) | 1.80 | 0.21 (11.9%) | 0.26 | 0.21 (80.5%) | 0.19 | 0.13 (70.5%) | 0.21 | 0.10 (49.2%) | 0.18 | 0.09 (52.3%) |
| Furfural (µg/l) | 750.57 | 29.04 (3.9%) | 555.14 | 31.64 (5.7%) | 301.53 | 22.78 (7.6%) | 184.47 | 22.14 (12.0%) | 139.87 | 17.98 (12.9%) |
| trans-2-nonenal (µg/l) | 0.15 | 0.14 (92.6%) | 0.03 | 0.03 (108.0%) | 0.01 | 0.02 (105.7%) | 0.01 | 0.01 (91.4%) | 0.01 | 0.01 (98.8%) |
| benzaldehyde (µg/l) | 3.13 | 0.24 (7.6%) | 0.38 | 0.25 (66.0%) | 0.30 | 0.26 (86.8%) | 0.43 | 0.26 (60.1%) | 0.41 | 0.22 (55.3%) |
| sum of Strecker (µg/l) | 237.44 | 37.28 (15.7%) | 57.24 | 11.58 (20.2%) | 33.84 | 13.47 (39.8%) | 27.08 | 18.01 (66.5%) | 22.72 | 17.34 (76.3%) |
| sum of total aldehydes (µg/l) | 993.09 | 66.91 (6.7%) | 613.06 | 43.71 (7.1%) | 335.88 | 36.65 (10.9%) | 212.21 | 40.52 (19.1%) | 163.19 | 35.65 (21.8%) |
| Ethanol (vol. %) | 0.10 | 0.00 | 0.01 | 0.00 | 2.73 | 0.00 | 4.36 | 0.02 | 4.90 | 0.00 |
| Glucose (g/100 ml) | 0.36 | 0.44 | 0.41 | 0.47 | 0.30 | 0.43 | 0.21 | 0.29 | 0.15 | 0.21 |
| Fructose (g/100 ml) | 0.15 | 0.17 | 0.14 | 0.16 | 0.13 | 0.18 | 0.09 | 0.13 | 0.07 | 0.10 |
| Sucrose (g/100 ml) | 0.02 | 0.10 | 0.10 | 0.13 | 0.00 | 0.00 | 0.00 | 0.00 | 0.00 | 0.00 |
| Maltose (g/100 ml) | 1.58 | 2.10 | 2.01 | 2.20 | 1.30 | 1.69 | 0.81 | 1.10 | 0.55 | 0.75 |
| Maltotriose (g/100 ml) | 0.47 | 0.62 | 0.59 | 0.64 | 0.42 | 0.55 | 0.34 | 0.44 | 0.30 | 0.39 |
| Total sugars (g/100 ml) | 2.59 | 3.42 | 3.25 | 3.60 | 2.16 | 2.85 | 1.45 | 1.97 | 1.07 | 1.45 |
| ethyl acetate (mg/l) | 2.7 | 0.04 | 0.14 | 0.04 | 16.75 | 0.11 | 26.89 | 0.35 | 30.82 | 0.23 |
| ethyl propanoate (µg/l) | 13.2 | 2.3 | 2.5 | 2.1 | 74.2 | 2 | 125.3 | 3.6 | 141.1 | 2.8 |

TABLE 1-continued

| Distillation: | Wort | | CC | | 50/50 LB/CC | | 80/20 LB/CC | | 90/10 LB/CC | |
|---|---|---|---|---|---|---|---|---|---|---|
| | before | After | before | after | before | after | before | after | before | after |
| ethyl butanoate (µg/l) | 15.98 | 0.24 | 1.13 | 6.17 | 67.59 | 0.54 | 103.65 | 2.12 | 111.61 | 0.99 |
| iso-amyl acetate (mg/l) | 0.93 | 0.01 | 0.09 | 0.01 | 3.78 | 0.06 | 5.54 | 0.1 | 6.03 | 0.17 |
| Free amino nitrogen (mg/l) | 63 | 81 | 67 | 80 | 71 | 91 | 85 | 109 | 94 | 119 |
| acetaldehyde (mg/l) | 0.43 | 0.02 | 2.35 | 0.7 | 2.63 | 0.6 | 3.68 | 1.1 | 3.91 | 1.2 |

MTP = methylthiopropionaldehyde

Example 2

Comparison of the Obtained Beer with Commercial Zero- or Low Alcohol Beer Types

A beer obtained using the present method was compared to existing zero-alcohol beers by a taste panel of 17 trained panelists. Beers were evaluated on specific flavor attributes, including sweetness, worty flavor and total flavor intensity, as well as other flavor notes. For each attribute the perceived intensity was indicated on a line scale. All panelists evaluated all beers on all attributes, and the results were averaged. The results are given in table 2.

A beer obtained with the present method has a less worty taste and less sweet taste, and a lower taste intensity, and consequently a less overpowering flavor, than commercial zero or low alcohol beers. The likelihood that consumers become saturated with the taste within only a few beers is thus lower. In addition, the beer is generally considered less thick, and more refreshing. For this reason, the present beer is considered more drinkable than existing commercial zero or low alcohol beers.

TABLE 2

| | Present beer | Commercial beer A | Commercial beer B | Commercial beer C | Commercial beer D | Commercial beer E |
|---|---|---|---|---|---|---|
| Sweet taste | 18 | 28 | 26 | 23 | 23 | 17 |
| Wort flavor | 27 | 39 | 42 | 28 | 33 | 38 |
| Fruity/estery flavor | 31 | 17 | 18 | 33 | 20 | 16 |
| >Peardrop flavor | 29 | 14 | 12 | 21 | 15 | 12 |
| >Tropical fruit flavor | 9 | 5 | 7 | 19 | 2 | 1 |
| >Green apple flavor | 11 | 2 | 4 | 5 | 2 | 3 |
| Hop flavor | 14 | 10 | 8 | 24 | 11 | 17 |
| Vinegar flavor | 2 | 1 | 0 | 5 | 1 | 10 |
| Total intensity | 40 | 44 | 45 | 46 | 43 | 47 |
| Refreshing mouthfeel | 42 | 3 | 35 | 32 | 37 | 36 |
| Thickness mouthfeel | 27 | 32 | 32 | 29 | 28 | 29 |
| Warming mouthfeel | 5 | 5 | 2 | 5 | 5 | 3 |
| Sweet aftertaste | 18 | 25 | 25 | 23 | 23 | 15 |

The invention claimed is:

1. A distilled mixture of restricted-fermentation beer and regular beer in a ratio of 5:95 to 50:50;
   the distilled mixture having an ethanol content of 0-1.0 vol. %, and having:
   a) a total sugar content, defined as the total of glucose, fructose, sucrose, maltose, and maltotriose, of at least 0.2 g/100 ml; and
   b) a total of Strecker aldehydes, defined as the total of 2-methylpropanal, 2-methylbutanal, 3-methylbutanal, 3-methylthiopropionaldehyde, and phenylacetaldehyde, of less than 50 µg/l; and/or having
   a) less than 18 µg/l 2-methylpropanal;
   b) less than 3.8 µg/l 2-methylbutanal;
   c) less than 14 µg/l 3-methylbutanal;
   d) less than 10 µg/l 3-methylthiopropionaldehyde;
   e) less than 20 µg/l phenylacetaldehyde, wherein the weight ratio of the total weight of 2-methylpropanal, 2-methylbutanal, 3-methylbutanal, 3-methylthiopropionaldehyde, and phenylacetaldehyde, relative to maltose, is less than 15 µg/g maltose.

2. The distilled mixture according to claim 1, wherein the quantity of 2-methylpropanal is less than 18 µg/l; and/or
   the quantity of 2-methylbutanal is less than 3.8 µg/l; and/or
   the quantity of 3-methylbutanal is less than 14 µg/l; and/or
   the quantity of 3-methylthiopropionaldehyde is less than 10 µg/l; and/or
   the quantity of phenylacetaldehyde is less than 20 µg/l.

3. The distilled mixture according to claim 1, wherein the quantity of 2-methylpropanal is less than 10 µg/l; and/or
   the quantity of 2-methylbutanal is 0.2-2.5 µg/l; and/or
   the quantity of 3-methylbutanal is 1-10 µg/l; and/or
   the quantity of 3-methylthiopropionaldehyde is 2-8 µg/l; and/or
   the quantity of phenylacetaldehyde is 1-8 µg/l.

4. The distilled mixture according to claim 1, wherein the quantity of 2-methylpropanal is 2-10 µg/l.

5. The distilled mixture A beer according to claim 1, wherein the total of 2-methylpropanal, 2-methylbutanal, 3-methylbutanal, 3-methylthiopropionaldehyde, and phenylacetaldehyde is less than 50 ug/l.

6. The distilled mixture according to claim 1, wherein the total of aldehydes, defined as the total of 2-methylpropanal, 2-methylbutanal, 3-methylbutanal, 3-methylthiopropionaldehyde, phenylacetaldehyde, hexanal, trans-2-nonenal, benzaldehyde and furfural is less than 80 µg/l.

7. The distilled mixture according to claim 1, wherein the total of glucose, fructose, sucrose, maltose, and maltotriose comprises 50-100 wt. % of maltose.

8. The distilled mixture according to claim 1, further comprising a quantity of less than 2 mg/l AcHFA, wherein AcHFA is a C12-C22 fatty acid, comprising a carboxylic acid group and a C11-C21 linear alkyl group, which alkyl group may be partially unsaturated, and which alkyl group is substituted with at least one hydroxy group and at least one acetate group.

9. The distilled mixture according to claim 1, further comprising at least 0.001 µg/l ethyl-2-methylpentanoate.

10. The distilled mixture according to claim 1, further comprising 20-250 mg/l of free amino nitrogen (FAN).

11. The distilled mixture according to claim 1, further comprising 50-200 mg/l free amino nitrogen (FAN).

12. The distilled mixture according to claim 1, further comprising 75-150 mg/l free amino nitrogen (FAN).

13. The distilled mixture according to claim 1, further comprising less than 5 mg/l acetaldehyde.

14. The distilled mixture according to claim 1, further comprising less than 3 mg/l acetaldehyde.

* * * * *